US008133952B2

(12) United States Patent
Pisanova et al.

(10) Patent No.: US 8,133,952 B2
(45) Date of Patent: *Mar. 13, 2012

(54) POLY (VINYL ALCOHOL)—BASED FORMALDEHYDE-FREE CURABLE AQUEOUS COMPOSITION

(75) Inventors: Elena Pisanova, Mississauga (CA); Robert Schmidt, Thornhill (CA); Alexander Tseitlin, Mississauga (CA)

(73) Assignee: Dynea Oy, Helsinki (FI)

( * ) Notice: Subject to any disclaimer, the term of this patent is extended or adjusted under 35 U.S.C. 154(b) by 587 days.

This patent is subject to a terminal disclaimer.

(21) Appl. No.: 11/418,306

(22) Filed: May 5, 2006

(65) Prior Publication Data

US 2006/0252855 A1 Nov. 9, 2006

Related U.S. Application Data

(60) Provisional application No. 60/678,229, filed on May 6, 2005.

(51) Int. Cl.
*C08K 5/09* (2006.01)
*C08G 4/00* (2006.01)
(52) U.S. Cl. ..... 524/803; 524/732; 525/54.3; 525/54.31
(58) Field of Classification Search .................. 524/503, 524/211, 47, 321, 732, 803; 525/54.3, 54.31
See application file for complete search history.

(56) References Cited

U.S. PATENT DOCUMENTS

| 3,630,831 | A | * | 12/1971 | Jongetjes | 162/156 |
|---|---|---|---|---|---|
| 4,076,917 | A | | 2/1978 | Swift et al. | |
| 4,537,807 | A | | 8/1985 | Chan et al. | |
| 4,625,029 | A | | 11/1986 | Floyd et al. | |
| 4,656,296 | A | | 4/1987 | Floyd | |
| 4,695,606 | A | * | 9/1987 | Floyd et al. | 525/160 |
| 4,780,339 | A | | 10/1988 | Lacourse et al. | |
| 5,006,140 | A | | 4/1991 | Loercks et al. | |
| 5,143,582 | A | * | 9/1992 | Arkens et al. | 162/135 |
| 5,354,803 | A | * | 10/1994 | Dragner et al. | 524/503 |
| 5,840,787 | A | * | 11/1998 | West et al. | 524/35 |
| 5,919,716 | A | * | 7/1999 | Raynolds et al. | 442/154 |
| 5,932,689 | A | | 8/1999 | Arkens et al. | |
| 6,042,630 | A | | 3/2000 | de Groot | |
| 6,183,531 | B1 | | 2/2001 | De Groot et al. | |
| 6,221,973 | B1 | * | 4/2001 | Arkens et al. | 525/327.7 |
| 6,331,350 | B1 | | 12/2001 | Taylor et al. | |
| 6,379,499 | B1 | | 4/2002 | Yang et al. | |
| 6,444,750 | B1 | * | 9/2002 | Touhsaent | 525/58 |
| 6,482,876 | B1 | * | 11/2002 | Witt-Nuesslein et al. | 524/35 |
| 6,562,267 | B1 | | 5/2003 | Hansen | |
| 6,699,945 | B1 | * | 3/2004 | Chen et al. | 525/445 |
| 6,884,849 | B2 | | 4/2005 | Chen et al. | |
| 6,960,627 | B2 | * | 11/2005 | Huth et al. | 525/59 |
| 7,893,154 | B2 | * | 2/2011 | Van Herwijnen et al. | 525/54.3 |
| 2003/0008586 | A1 | * | 1/2003 | Kajander et al. | 442/327 |
| 2004/0122166 | A1 | | 6/2004 | O'Brien-Bernini et al. | |
| 2004/0167260 | A1 | * | 8/2004 | Chen et al. | 524/321 |
| 2004/0254285 | A1 | | 12/2004 | Rodrigues et al. | |

FOREIGN PATENT DOCUMENTS

| CA | 2 507 646 A1 | 9/2004 |
|---|---|---|
| EP | 0 255 859 A1 | 2/1988 |
| EP | 0 631 466 B1 | 7/1996 |
| EP | 1 486 547 A2 | 12/2004 |
| GB | 1 336 426 | 11/1973 |
| JP | 04139236 * | 5/1992 |
| WO | WO-92/19095 A1 | 11/1992 |
| WO | WO-97/07664 A1 | 3/1997 |
| WO | WO-03/104284 A2 | 12/2003 |
| WO | WO 2004/076734 A1 | 9/2004 |
| WO | WO-2006/120523 A1 | 11/2006 |

OTHER PUBLICATIONS

Polyvinyl Alcohol Chemical and Techincal Assessment. S.K. Saxena, 61$^{st}$ JECFA 2004 p. 1.*
Tautomerism: http://www.britannica.com/EBchecked/topic/13527/aldehyde/277603/Tautomerism; Encyclopedia Britannica, 2009.*
Celvol® MSDS. Obtained from www.celanese.com. No Author, No Date.*
Chen et al. Journal of Environmental Polymer Degradation. vol. 5, No. 2. pp. 111-117. 1997.*
Park et al. Journal of Polymers and the Environment. vol. 13, No. 4. pp. 375-382. 2005.*
Translation of Chinese Office Action mailed Sep. 9, 2010.

* cited by examiner

*Primary Examiner* — Mark Eashoo
*Assistant Examiner* — Michael Salvitti
(74) *Attorney, Agent, or Firm* — Birch, Stewart, Kolasch & Birch, LLP

(57) ABSTRACT

A formaldehyde-free curable aqueous composition containing polyvinyl alcohol, a multi-functional crosslinking agent, and, optionally, a catalyst. The composition may be used as a binder for non-woven products such as fiberglass insulation. The non-woven products are formed by contacting the formaldehyde-free curable aqueous composition with fibrous components and the mixture is cured to form a rigid thermoset polymer providing excellent strength and water resistance of the cured nonwoven product.

28 Claims, No Drawings

POLY (VINYL ALCOHOL)—BASED FORMALDEHYDE-FREE CURABLE AQUEOUS COMPOSITION

This Nonprovisional application claims priority under 35 U.S.C. §119(e) on U.S. Provisional Application No. 60/678,229 filed on May 6, 2005, the entire contents of which are hereby incorporated by reference.

FIELD OF THE INVENTION

This invention relates to thermosetting self-crosslinking formaldehyde-free resins, a process for preparing said resins and their use as binders for nonwovens.

BACKGROUND OF THE INVENTION

Formaldehyde-based resins, e.g. Phenol-Formaldehyde (PF), Melamine-Formaldehyde (MF), Urea-Formaldehyde (UF) resins are widely used as nonwovens binder for various industrial applications such as fiberglass insulation industry, paper impregnation, filtration media, and roofing materials. These formaldehyde-based resins are inexpensive, have low viscosity, and are able to cure to form a rigid polymer, thereby providing the finished product with excellent physical properties.

Fiberglass insulation products consist of glass fibers bonded together with covalently crosslinked binder resins. Processes for making fiberglass insulation generally include drawing molten streams of glass to spinning wheels where they are spun into thin fibers by centrifugal force. The fibers are then blown into a forming chamber, sprayed with an aqueous binder and deposited as a mat onto a traveling conveyor. Thereafter, the coated mat is transferred to a curing oven where heated air is blown through the mat to cure the binder and rigidly bond the glass fibers together.

PF resins, typically extended with urea, are widely used throughout the fiberglass insulation industry.

PF resins are also used as a binder for nonwoven filtration media. These filtration products are typically made by a wet-laid technique wherein fibers, e.g. glass or cellulose fibers, are dispersed in aqueous binder slurry. The fibers are then deposited from the binder slurry onto a conventional screen or wire as in a Fourdrinier machine to form a mat, which includes a binder resin, e.g., a phenolic resin.

MF resins are used in manufacturing overlay paper laminates. In general, a porous substrate, such as paper or a fabric web, is impregnated with an MF resin and dried. The dried resin impregnated substrate, along with other layers, are pressed usually with heat to form a laminate.

Glass fiber mats for roofing industry are made by applying a UF-based binder to a wet glass fiber mat, followed by drying and curing the binder at elevated temperatures.

A serious disadvantage of PF, MF and UF resins is high concentration of free formaldehyde, which is undesirable for ecological reasons. During the curing reaction, formaldehyde is volatilized from the binder into the surrounding environment. Although addition of urea to PF resins results in decreasing formaldehyde emissions, at the same time, ammonia emissions and "blue smoke" increase dramatically. Therefore, there is a continuing need for alternative nonwovens binder that would not emit formaldehyde upon curing.

A number of formaldehyde-free compositions have been developed for use as a binder for making nonwoven products.

U.S. Pat. No. 4,076,917 discloses the use of beta-hydroxyalkylamides to cure polycarboxy polymers such as polyacrylic acid. Such a system, however, is too viscous for use as a fibrous glass binder.

U.S. Pat. No. 5,143,582 discloses heat-resistant nonwovens containing ammonia-neutralized polycarboxylic acids, either monomeric or polymeric, and beta-hydroxyalkylamides. However, the binder compositions are believed to liberate ammonia upon cure. Ammonia emissions are becoming increasingly tightly regulated.

U.S. Pat. Nos. 6,221,973 and 6,331,350 describe a formaldehyde-free fiberglass binder including a polyacid, such as polyacrylic acid, and a polyol, with a molecular weight less than about 1000, such as, for example, glycerol, triethanolamine, sorbitol, or ethylene glycol. A phosphorous catalyst is used to accelerate the cure of the composition.

U.S. Pat. No. 5,932,689 describes a curable aqueous composition for fiberglass insulation, which contains (a) a polyacid comprising at least two carboxylic acid groups, anhydride groups, or salts thereof; (b) an active hydrogen-containing compound, such as polyol or polyamine, and (c) a cyanamide, a dicyanamide or a cyanoguanidine. Suitable accelerators include phosphorous or fluoroborate salts.

WO 03/104284 describes an epoxide-type formaldehyde-free insulation binder containing a substantially infinitely water-dilutable or water-dispersable mixture of an epoxide and a multi-functional cross-linker, such as polyamidoamine polymer.

Despite these disclosures, there is a growing need for new formaldehyde-free aqueous compositions suitable for use as a binder for fiberglass insulation, roofing and filtration materials, as well as for paper impregnation.

Some of the drawbacks and limitations of the above-described systems include high cost, high viscosity, low pH causing corrosion of metal parts along the production lines, and high cure temperatures. Thus, new formaldehyde-free binders having lower cost and curing energy requirements similar to those of phenol-formaldehyde resins are desired.

Polyvinyl Alcohol (PVOH) is a water-soluble polymer known to have various uses in view of its excellent properties. PVOH is a polymer with high tensile strength, excellent flexibility, good water resistance and outstanding binding capacity (Finch, C. A., Ed., "Polyvinyl Alcohol: Properties and Applications", John Wiley & Sons, 1973, pp. 227-230). In view of these advantageous properties, PVOH has been used in the paper processing industry for surface and internal sizing of paper and to impart water resistance to paper. PVOH-based aqueous compositions are also used as coating solutions. However, such systems are generally too viscous for use as a fibrous glass binder.

U.S. Pat. Application No. 20030008586 discloses the use of PVOH as a formaldehyde-free binder solution for low binder nonwoven fiber mat useful for making wood product laminates. The binder produces high bonding strength with wood and is characterized by good storage stability. The binder is used at 5% concentration.

U.S. Pat. No. 6,444,750 describes a curable aqueous PVOH-based coating solution for polymeric substrates. Organic acids such as lactic acid, maleic acid, and citric acid are used as cross-linking promoters. The pH of the solutions is 3.5 or less, which provides substantially 100% cure of PVOH upon drying. The coating solutions exhibit improved viscosity stability. However, formaldehyde-containing crosslinkers are used as the crosslinking agent.

U.S. Pat. No. 6,379,499 describes an aqueous composition for paper treatment, which contains PVOH, a multifunctional aldehyde and a catalyst. Glutaraldehyde and glyoxal are used as cross-linking agent at a concentration of about 50% to about 800% of the weight of PVOH. The aqueous compositions for paper treatment contained about 1% PVOH. After curing the compositions at a temperature between 100° C. and 200° C. for 0.5-5 minutes, the paper demonstrated improved tensile strength and folding endurance.

U.S. Pat. No. 5,354,803 describes a nonwoven binder containing a graft-copolymer of low or ultra-low molecular weight PVOH (12-35%) and a vinyl and/or acrylic monomer (65-88%). The binder is used as a latex (emulsion), which is applied to nonwoven polyester roofing mat. After curing the compositions at a temperature 149-154° C. for 3-5 minutes, the nonwoven products exhibit high temperature resistance, tensile strength and elongation resistance.

U.S. Pat. No. 6,884,849 (hereinafter "the '849 patent") describes a poly alcohol-based binder composition comprising a low molecular weight polycarboxylic acid and a low molecular weight poly-alcohol, such as PVOH having a number average molecular weight of <7,000. The binder solution preferably comprises at least one cure catalyst or accelerator, such as sodium hypophosphite. The binder exhibits a high cure rate and provides a good recovery of the final nonwoven product. However, a practical use of such a composition for insulation production is limited by its rather low concentration (10-30%) and the high acidity causes corrosion of production lines and problems with cure strength of the final binder product.

While these references and other prior art systems disclose various PVOH-based curable compositions, they have certain limitations with respect to developing a nonwoven binder. A number of these systems have the disadvantage of using formaldehyde-based cross-linkers. Other cross-linking agents release formaldehyde during the cure, for example, N-methylol acrylamide. Further, these conventional systems are used as diluted binders containing, as a rule, 1-5% PVOH. This limitation is due to the high viscosity of aqueous PVOH solutions.

Thus, there is a need in developing new PVOH-based nonwoven binders that could be cured by non-formaldehyde cross-linkers. It is desirable that such curable PVOH compositions contain higher amounts of non-volatiles (sometimes referred to as "NV" hereinafter) (about 25-40% by weight of the resin), and at the same time are stable and infinetely water-dilutable.

SUMMARY OF THE INVENTION

The invention is drawn to a curable aqueous composition comprising: (a) a hydroxy-containing polymer; (b) a multi-functional crosslinking agent which is at least one selected from the group consisting of a nonpolymeric polyacid, salts thereof, an anhydride, and a nonpolymeric polyaldehyde, and optionally (c) a catalyst; wherein the weight ratio of (a):(b) is from 95:5 to about 35:65, and wherein the curable composition has a pH of at least 1.25.

The invention is also drawn to a method for forming a curable aqueous composition comprising: a step of combining (a) a hydroxy-containing polymer with (b) a multi-functional crosslinking agent which is at least one selected from the group consisting of a nonpolymeric polyacid, salts thereof, an anhydride, and a nonpolymeric polyaldehyde at a weight ratio of (a):(b) of from 95:5 to about 35:65, and optionally (c) a catalyst to form a curable aqueous composition; and if the curable aqueous composition has a pH of below 1.25, then the method further comprises a step of adding sufficient base to raise the pH to at least 1.25.

The invention is also drawn to a cured composition comprising a nonwoven fiber in a cured binder wherein the cured composition is formed by combining the nonwoven fibers with said curable aqueous composition to form a mixture and curing the mixture.

The invention is also drawn to a method for forming a non-woven material comprising: combining the nonwoven fibers with said curable aqueous composition, and heating the mixture at 130° C. to 230° C. for sufficient time to effect cure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

An embodiment of the invention is a curable aqueous composition comprising: (a) a hydroxy-containing polymer; (b) a multi-functional crosslinking agent which is at least one selected from the group consisting of a nonpolymeric polyacid, salts thereof, an anhydride, and a nonpolymeric polyaldehyde, and optionally (c) a catalyst; wherein the weight ratio of (a):(b) is from 95:5 to about 35:65, and wherein the curable composition has a pH of at least 1.25. Preferably, the weight ratio of (a):(b) is from 80:20 to 45:55, and most preferably, the weight ratio of (a):(b) is from 65:35 to 50:50.

In an embodiment of the invention, the formaldehyde-free curable aqueous composition of this invention may optionally be neutralized with a base. In particular, the pH is adjusted with at least one base selected from the group consisting of a nitrogenous base, sodium hydroxide, and potassium hydroxide. It is preferred to use a nitrogenous base and it is especially preferred that the nitrogenous base is ammonium hydroxide or triethanolamine. The preferred pH for the curable aqueous composition is up to 6.0. More preferably, the pH for the curable aqueous composition is from about 2.5 to 6.5. Even more preferably, the range of pH is 3.5 to 5.0. It is most preferred that the pH depends upon the type of multi-functional crosslinking agent used, i.e., when the multi-functional crosslinking agent is at least one selected from the group consisting of a nonpolymeric polyacid, salts thereof, an anhydride then the pH of the curable aqueous composition is in the range of 3.0-4.0 and when the multi-functional crosslinking agent is a nonpolymeric polyaldehyde, then the pH is greater than 4.0 up to and including 6.5.

In an embodiment of the invention, (a) a hydroxy-containing polymer is a polyvinyl alcohol (PVOH). However, it is envisioned that the hydroxy-containing polymer is a combination of polyvinyl alcohol and at least one selected from the group consisting of starch, modified starch and a sugar. Preferably, the hydroxy-containing polymer is a combination of polyvinyl alcohol and starch. In the instance when the (a') PVOH is combined with (a'') starch and/or modified starch and/or sugar, the ratio of (a'): (a'') preferably ranges from 1:0.001 to 1:50. More preferably, the ratio of (a'):(a'') ranges from 1:0.1 to 1:5. These ratios are based on the weight of (a') and the weight of (a'').

The starch component may be a native or granular starch selected from the group consisting of potatoes, rice, tapioca, corn, peas, rye, oats, wheat and combinations thereof. Alternatively, the starch may be a modified starch, such as a hydrolysis product thereof (e.g. dextrin).

Surprisingly, it has been discovered that certain polyacids, their salts and anhydrides can be dissolved in viscous aqueous PVOH solutions, thereby decreasing their viscosity and increasing the non-volatiles content of the aqueous compositions. In an embodiment of the invention, the curable aqueous composition is prepared in a concentrated form hereinafter referred to as a "concentrated resin". The concentrated resin is diluted prior to curing, usually at the application site where it is combined with the fibers and then cured. Generically, both the concentrated resin form and the diluted resin form are herein referred to as the "curable aqueous composition".

In an embodiment of the invention, is a method for forming a non-woven material comprising: mixing fibers with said binder, and heating the binder and fibers at 130° C. to 230° C. for sufficient time to effect cure. Preferably, the diluted resin form comprises greater than 1% by weight of nonvolatiles immediately prior to curing. More preferably, the diluted resin form comprises 2 to 12% by weight of nonvolatiles immediately prior to curing. Most preferably, the diluted resin form comprises 3 to 6% by weight of nonvolatiles immediately prior to curing.

The concentrated resin is substantially infinitely water-dilutable, and the binder can be mixed with the nonwoven fiber material by spraying, soaking or other suitable methods commonly used by the industry. The material is then dried and the binder is cured in an oven at elevated temperatures, generally at 130-250° C. providing for the formation of a rigid thermoset polymer. Initially, when the binder is applied to the nonwoven, the binder is used in an excessive amount compared to the amount of nonwoven. However, upon curing of the binder, the final product preferably contains up to 10 wt % of cured polymer, more preferably from 2 wt % to about 8 wt % of cured polymer, wherein the wt % is based on the amount of fiber and cured polymer. It is envisioned that the fiber surface can be pretreated prior to application of the binder, e.g., with adhesion promoters, however, this is not preferred in view of the cost of this step.

In an embodiment of the invention, the PVOH is chosen so as to enable the preparation of a high-non-volatiles concentrated resin. A higher concentration of non-volatiles is important to the cost of its shipping and storage in view of the reduced volume of the composition. Preferably, the PVOH has a viscosity of up to 10 centipoise in a 4 wt % aqueous solution at 20° C. More preferably, the PVOH has a viscosity of 3.8 to 10.0 cps, and even more preferably the PVOH has a viscosity of 2.5 to 7.0 cps, and most preferably, the PVOH has a viscosity of 2.5 to 5.0 cps. Preferably, the PVOH has a number average molecular weight (as measured by light scattering) of greater than 7,000. Preferably, the number average molecular weight is in the range of 12,000 to 85,000.

Most preferably, the polyvinyl alcohol has a number average molecular weight in the range of greater than 13,000 to 45,000. Preferably, the PVOH has a weight average molecular weight (as measured by light scattering) of up to 85,000. More preferably the PVOH has a weight average molecular weight of 7,000 to 55,000, and most preferably, the PVOH has a weight average molecular weight of 13,000 to 23,000.

The PVOH can be formed from conventional methods known in the art and the method is not particularly restricted. It is preferred that the PVOH is not subjected to a modification reaction, such as free radical copolymerization with vinyl or acrylic monomers, prior to reaction with the multifunctional crosslinking agent (b). In an embodiment of the invention, the PVOH is a partially hydrolyzed polyvinyl acetate, or is a copolymer of ethenol and vinyl acetate. Fully hydrolyzed grades of PVOH, i.e., at least 98 mole % hydrolyzed, provide high tensile strength of the final product. However, these fully hydrolyzed grades are characterized by a higher viscosity of aqueous solutions. Preferably, the PVOH is from 70 mole % to 99 mole % hydrolyzed. More preferably, the PVOH is from 80 mole % to 90 mole % hydrolyzed.

In an embodiment of the invention, the polyacids used as cross-linkers for PVOH are acids having at least two acidic functional groups that will react with the alcohol moieties on the PVOH. It is preferred to use nonpolymeric polyacids. These nonpolymeric polyacids include at least one of maleic acid, succinic acid, citric acid, phthalic acid, glutaric acid, malic acid, phthalic acid or the like, and salts thereof.

In an embodiment of the invention, the cross-linker for PVOH is the anhydride of the nonpolymeric polyacid. These anhydrides include at least one of maleic anhydride, succinic anhydride, phthalic anhydride and the like. However, the use of anhydrides is not preferred in view of the tendency for the anhydride to lower the pH of the composition to unacceptably low levels and an extra step of neutralizing the composition with a base is required. In an embodiment of the invention, the PVOH is crosslinked without an anhydride.

In an embodiment of the invention, the cross-linker for PVOH is a nonpolymeric polyaldehyde having at least two aldehyde groups capable of reacting with the alcohol moieties on the PVOH. Preferably, the nonpolymeric polyaldehyde is at least one selected from the group consisting of glyoxal or glutaraldehyde. Polyaldehydes are effective crosslinkers of PVOH because of their high activity. However, a disadvantage of such a high activity may be a low stability of the PVOH-based binder and/or the reaction of polyaldehyde with other components of the composition before the curing. To prevent these undesirable reactions, the polyaldehyde can be blocked by reaction with a blocking agent at most or all of the aldehyde groups on the polyaldehyde before adding to the composition, as it was described in U.S. Pat. Nos. 4,695,606; 4,625,029, and 4,656,296, each of which are incorporated herein by reference in their entirety. The blocking agent inhibits the polyaldehyde from reacting with other components prior to drying. The inventive process can tolerate some free aldehyde (unblocked) groups, i.e., up to about 3 wt % of free aldehyde based on the weight of the composition, but it is preferred to have essentially all of the aldehyde groups blocked.

Suitable blocking agents include urea, substituted ureas (such as dimethyl urea), various cyclic ureas, carbamates (such as isopropyl or methyl carbamate), glycols, polyols (i.e. containing at least three hydroxy groups), unalkylated or partially alkylated polymeric glyoxal derived glycols such as poly(N-1',2'-dihydroxyethyl-ethylene urea) and mixtures thereof. Preferably, the blocking agent is a urea or cyclic urea because the blocked glyoxal resins formed are very stable providing long shelf life.

Typical examples of cyclic ureas include, but are not limited to, ethylene urea, propylene urea, uron, tetrahydro-5-(2-hydroxyethyl)-1,3,5-triazin-2-one, 4,5-dihydroxy-2-imidazolidone, 4,5-dimethoxy-2-imidazolidinone, 4-methyl ethylene urea, 4-ethyl ethylene urea, 4-hydroxyethyl ethylene urea, 4,5-dimethyl ethylene urea, 4-hydroxy-5-methyl propylene urea, 4-methoxy-5-methyl propylene urea, 4-hydroxy-5,5-dimethyl propylene urea, 4-methoxy-5,5-dimethyl propylene urea, tetrahydro-5-(ethyl)-1,3,5-triazin-2-one, tetrahydro-5-(propyl)-1,3,5-triazin-2-one, tetrahydro-5-(butyl)-1,3,5-triazin-2-one, dihydro-5-methyl-2(1H, 3H) pyrimidinone, dihydro-5,5-dimethyl-2 (1H) pyrimidinone, tetrahydro-4-5-methyl-2 (1H) pyrimidinone, tetrahydro-4-(2-hydroxyethyl)-5,5-dimethyl-2 (1H) pyrimidinone, and the like, and mixtures of these.

The polyol may be any of a wide variety of materials, including but not limited to ethylene glycol (to make 2,3-dihydroxydioxane), diethylene glycol, dialkylene glycol (to make an oligomeric condensation product) such as 1,2-propylene glycol, 1,3-propylene glycol, 1,2-butylene glycol, 1,3-butylene glycol, 1,4-butylene glycol, polyethylene glycols having the formula $HO(CH_2CH_2O)_nH$ where n is 1 to about 50, and the like, and their mixtures. Other suitable polyols (i.e. containing at least three hydroxy groups) can be used, such as glycerin, (to make 2,3-dihydroxy-5-hydroxymethyl dioxane) as well as unalkylated or partially alkylated polymeric glyoxal derived glycols such as poly(N-1',2'-dihydroxyethyl-ethylene urea), dextrans, glyceryl monostearate, ascorbic acid, erythrobic acid, sorbic acid, ascorbyl palmitate, calcium ascorbate, calcium sorbate, potassium sorbate, sodium ascorbate, sodium sorbate, monoglycerides of edible fats or oils or edible fat-forming acids, inositol, sodium tartrate, sodium potassium tartrate, glycerol monocaprate, sorbose monoglyceride citrate, α-D-methylglucoside, sorbitol, dextrose, and their mixtures.

In an embodiment of the invention, the formaldehyde-free curable aqueous composition of this invention may optionally contain cure accelerators (catalysts). The catalyst according to the present invention is selected from the group consisting of zinc chloride, zinc nitrate, ammonium chloride, ammonium sulphate, magnesium chloride, magnesium acetate, aluminum sulphate, aluminum chloride, sodium hypophosphite, sodium phosphite, and mixtures thereof.

In an embodiment of the invention, the viscosity of the curable aqueous composition is reduced to improve its suitability for some industrial applications. In these compositions, low molecular weight extenders and/or viscosity modifiers are added to improve processability of the binder. Any extender known in the art can be used, but it is preferred that the extender is urea, ethylene urea, or mixtures thereof, in an amount of 5 to 100 parts based on 100 parts of PVOH. Preferably, the extender is used in an amount of 20 to 70 parts, and most preferably, the extender is used in an amount of 35 to 50 parts based on 100 parts of PVOH. Any viscosity modifier known in the art that is compatible with the curable aqueous composition can be used, but it is preferable to use low molecular weight polyols. The low molecular weight polyol is at least one selected from the group consisting of glucose, sucrose, sorbitol, ethylene glycol, diethanolamine, triethanolamine, or the like. Preferably, the viscosity modifier is used in an amount of 35 to 80 parts based on 100 parts PVOH, and most preferably, the viscosity modifier is used in an amount of 45 to 65 parts based on 100 parts PVOH.

In an embodiment of the invention, the curable aqueous composition includes other components, e.g. emulsifiers, plasticizers, anti-foaming agents, biocide additives, anti-mycotics including, e.g., fungicides and mold inhibitors, adhesion promoting agents, colorants, waxes, antioxidants, corrosion inhibitors and combinations thereof.

In an embodiment of the invention, the curable aqueous composition includes solvents other than water to promote intimate mixing of the components.

The manner in which the PVOH is combined with the cross-linker can affect the concentration of the non-volatiles formed. One method of the present invention comprises a step of preparing one solution of PVOH and one solution of crosslinker and a second step of mixing the two solutions. However, a preferred method of the present invention comprises a first step of forming a PVOH solution and a second step of adding the crosslinker directly to the PVOH solution. This preferred method is surprising since it can have the advantage of improved viscosity while increasing the concentration of the non-volatiles formed, e.g., it was surprising that dissolving solid maleic anhydride allows for the simultaneous decrease in the viscosity with the increase in solid concentration.

In an embodiment of the invention, the curable aqueous composition is a concentrated solution and is produced having a non-volatiles content of greater than 25 wt %. Preferably, the non-volatiles content is greater than 30 wt %, and most preferably, the non-volatiles content is 32 wt % to 43 wt % based on the weight of the concentrated resin composition. This concentrated resin composition is a clear solution.

The concentration of the curable aqueous composition to be applied to the fiber depends on the type of fiber. In an embodiment of the invention, the curable aqueous composition to be applied to the fiber is produced having a non-volatiles content of at least 1% by weight. Preferably, the non-volatiles content is 2 wt % to 12 wt %, and most preferably, the non-volatiles content is 3 wt % to 6 wt % based on the weight of the binder. This binder is a clear solution.

In an embodiment of the invention, the concentrated resin has a viscosity of below 1000 centipoise, preferably, below 750 centipoise when measured at 30 wt % aqueous solution at 20° C. As mentioned above, the concentrated resin can be stored and shipped to an application site. Immediately before the application to the fiber, it is diluted by water (and optionally, combined with other additives) to form the binder. Most preferably, the concentrated resin has a viscosity of below 500 centipoise.

In an embodiment of the invention, the cross-linking reaction can optionally be performed with a catalyst. It is preferred to perform the curing reaction without a catalyst. The PVOH and the multifunctional crosslinking agent can be self-crosslinked by heat providing the formation of a rigid thermoset polymer. This curing reaction is performed at a temperature between 130° C. and 250° C. for 3-10 minutes. Preferably, the reaction is performed at a temperature between 130° C. and 220° C. for 3 to 10 minutes, and most preferably, the reaction is performed at a temperature between 150° C. and 210° C. for 3 to 7 minutes.

The amount of crosslinking is related to the degree of the cure of a curable composition and is measured herein by Retention %. The higher the retention indicates a higher degree of cross-linking.

The curable aqueous composition of the invention can be used to prepare nonwoven products by a variety of methods known in the art, which, in general, involve the impregnation of a loosely assembled mass of fibers with the binder solution to form a mat. The fibers may comprise natural fiber such as cellulose, wool, jute; synthetic fibers such as polyesters, acrylics, nylon, polyamides, ceramics, glass fibers, and the like, alone or in combinations with one another. Preferably the product is used in paper impregnation, building insulation, a roofing fiberglass mat or a nonwoven filtration material.

Generally, fibers having a length of about ¼ inch to 3 inches and a diameter of about 3 to 20 microns are used in the wet-laid process (for example, roofing materials production).

Glass fibers typically used in manufacturing insulation products (that are produced using melt-blown technique) range in diameter from about 2 to 9 microns, and have a length of about ½ inch to 2 inches.

Herein, the number average molecular weight of the polymers is determined by the light scattering technique. The viscosity is determined by a Brookfield viscosimeter (#2 spindle, 30 rpm).

Herein, the term "nonpolymeric" is used to define a compound which will not form covalent bonds with itself under the reaction conditions for mixing the components and for the curing reaction of the present invention and the term includes compounds which are preliminarily formed by covalently linking up to three identical monomers prior to curing with PVOH.

Unless otherwise indicated, all concentrations in weight percent as described herein are based on the entire weight of the composition.

EXAMPLES

Use of Polyaldehydes as Cross-Linkers:

Example 1

Comparative

Preparation of binder containing PVOH and a Polyaldehyde:

PVOH solution was prepared by adding a sufficient amount of solid PVOH (CELVOL® 205S, by Celanese, 88.5% hydrolyzed), to water to form a 25 wt % solution wherein the wt % is based on the weight of the composition. 100 grams of PVOH solution were mixed with 31 grams of 40 wt % glyoxal. The final composition had infinite water dilutability (WD). However, it was gelled in 10 minutes at room temperature.

Example 2

Inventive

Preparation of Blocked Glyoxal (1)
Ethylene Urea—Ethylene Glycol—Glyoxal Condensate (EEG):

To a 1-liter 3-necked flask equipped with a mechanical stirrer, reflux condenser, and thermometer were charged 102 grams of ethylene urea (40 wt %), 39 grams of ethylene glycol, and 97 grams of glyoxal (40 wt %). Initial pH of the mixture was 4.3. The mixture was stirred, heated to 70° C., and held at this temperature for four hours. The product (EEG) was a clear yellow liquid with NV %=43.6%, pH=3.9 and infinite WD. The composition was stable for at least 3 months (clear, no gellation, infinite WD).

Example 3

Inventive

Preparation of Blocked Glyoxal (2)
Sorbitol—Glyoxal Condensate (SG):

To a 1-liter 3-necked flask equipped with a mechanical stirrer, reflux condenser, and thermometer were charged 130 grams of sorbitol (70 wt %) and 145 grams of glyoxal (40 wt %). The mixture was stirred, heated to 75° C., and held at this temperature for four hours. The product (SG) was a clear colorless liquid with NV %=54.3%, pH=2.3, and infinite WD. The composition was stable for at least 3 months (clear, no gellation, infinite WD).

Example 4

Inventive 200 grams of 25 wt % aqueous solution of PVOH (CELVOL® 205S) were mixed at room temperature with 115 grams of EEG (Example 2), at a ratio of 1:1 (by weight per non-volatiles). The resin composition had NV %=30.7%, pH=5.7, an infinite WD, and was stable for at least 2 months at room temperature.

Example 5

Inventive 200 grams of 25 wt % aqueous solution of PVOH (CELVOL® 205S) were mixed at room temperature with 92 grams of SG (Example 3), at a ratio of 1:1 (by weight per non-volatiles). The resin composition had NV %=32.8%, pH=5.3, an infinite WD, and was stable for stable for at least 2 months at room temperature.

Example 6

Inventive

Binder Compositions

The resins of Examples 4-5 were combined with the catalysts to give final binder compositions. These compositions are given in the following Table 1.

TABLE 1

| Binder Compositions | Example # | Resin parts | Additive* | Additive parts |
|---|---|---|---|---|
| A | 4 | 100 | — | — |
| B | 4 | 95 | AC | 5 |
| C | 5 | 94 | CA | 6 |
| D | 5 | 96 | AS | 4 |

*AC—ammonium chloride, AS—ammonium sulphate, CA—citric acid

Example 7

Inventive

Tensile Testing of Cured Glass Fiber Specimens

Binder Compositions A-D were each individually diluted with water to give a binder solution having 5% non-volatiles, and the binder solution was applied to a glass fiber substrate as follows.

Glass paper (Whatman 934-AH) was soaked in the binder solution for 10 minutes, then the excess liquid was removed by vacuum. The samples were put into an oven at 200° C. for 5 minutes for curing of the binder resin.

The cured samples were cut into specimens having the dimensions of 6"×1" and tested for dry tensile strength by placing them in the jaws of a Lloyd Instruments LRX Plus tensile tester. Samples were pulled apart at a crosshead speed of 2 inches/minute.

For wet tensile testing, the specimens were treated with hot water at 80° C. for 10 minutes, and then tested for tensile strength while still wet. Retention was calculated as a ratio Wet strength/Dry Strength. Retention is a measure of the degree of cure of a curable composition: higher retention indicates higher degree of cross-linking.

The load in Kgf was measured at the break. The test results are presented in the Table 2.

TABLE 2

| Binder | Dry strength, kgf | Wet strength, kgf | Retention, % |
|---|---|---|---|
| A | 6.5 | 1.2 | 18 |
| B | 6.3 | 4.7 | 75 |
| C | 6.1 | 4.8 | 79 |
| D | 6.9 | 5.0 | 72 |

The results indicate that the cure of glyoxal-based systems can be significantly improved upon addition of an acidic catalyst. Binder A was cured without catalyst, and shows an insufficient degree of cure. On the contrary, PVOH based compositions B-D cured with an acidic additive showed high wet strength and retention.

Use of Polyacids as Cross-Linkers:

Example 8

Comparative

The example of the '849 patent was repeated as a comparative example to show that the pH of the final binder solution was outside of the present invention.

Following the instructions given for Example 1 of the '849 patent, a 30% aqueous solution was prepared using the low MW PVOH (CELVOL® 502, Celanese) of the '849 patent which is taught at column 5, lines 38-39 of the '849 patent to have an Mn<7,000. A 30% aqueous solution of maleic anhydride was separately prepared. Then both solutions were combined. In this final solution, the ratio of PVOH to maleic anhydride was 1:1, and pH was found to be 1.0.

Example 9

Inventive

Comparative Example 8 was essentially repeated, except that the binder composition was neutralized with 29% ammonium hydroxide to pH=3.5.

Example 10

Inventive

Testing of Cured Glass Fiber Specimens

The tensile testing for Resin Compositions of Comparative Example and Inventive Example 9 was conducted in the same manner as described above for Binder Compositions A-D in Example 7.

Also, the water resistance was evaluated by the time needed to absorb a droplet of water put on surface of the cured glass fiber sheet. The same samples were used that were tested for tensile strength.

The results are shown in Table 3.

TABLE 3

| Binder | Dry strength, kgf | Wet strength, kgf | Retention, % | Water absorption, min |
|---|---|---|---|---|
| Comparative Example 8 | 4.9 | 2.3 | 47 | 0.1 |
| Inventive Example 9 | 6.0 | 4.9 | 82 | 2.0 |

The results indicate that the cure of polyacid based systems can be significantly improved upon neutralization. The neutralized composition showed improved strength and retention, as well as a better water resistance.

Example 11

Inventive

To a 1-liter 3 necked flask equipped with a mechanical stirrer, reflux condenser, and thermometer were charged 200 grams of 25 wt % PVOH (CELVOL® 205S) solution. As this was stirred, 50 grams of solid maleic anhydride were added at room temperature. Then the temperature was raised to 60° C. and the composition was stirred until the anhydride dissolved. The solution was cooled to 25° C. to give a colorless clear liquid of pH 1.5. The composition was then neutralized by slow addition of 29% ammonium hydroxide. The neutralized resin had pH=3.6, NV %=33.8%, and viscosity 635 cps.

Example 12

Inventive 33 grams of solid maleic anhydride were added at room temperature to 200 grams of 25 wt % PVOH and dissolved as in Example 11. After that, 17 grams of solid citric acid were added at room temperature. The composition was stirred until citric acid was dissolved, and then neutralized by ammonium hydroxide. The neutralized resin had pH=3.5, NV %=33.5%, and viscosity 650 cps.

Example 13

Inventive 50 grams of solid maleic anhydride were added at room temperature to 200 grams of 25 wt % PVOH and dissolved as in Example 11. After that, 40 grams of 50% citric acid and 29 grams of 70% glucose solution were added at room temperature. The composition was stirred for 15 minutes, and then neutralized by slow addition of ammonium hydroxide. The neutralized resin composition had NV=35.8%, pH=3.6, and viscosity 480 cps.

Example 14

Inventive

To a 1-liter 3 necked flask equipped with a mechanical stirrer, reflux condenser, and thermometer were charged 42 grams of solid maleic anhydride and 63 grams water. The mixture was stirred at 65° C. until the anhydride was dissolved. In a beaker, slurry was prepared of 42 grams starch (Water soluble starch, ACS reagent from Sigma-Aldrich), and 63 grams water. This slurry was slowly added to the maleic anhydride solution at a continuous mixing. The temperature was kept in the range of 80-85° C. After all starch was added, the liquid was mixed for additional 15 minutes at 80° C. After that, it was cooled down to 60° C. To the mixture, 224 grams of 25 wt % PVOH, 42 grams of solid maleic anhydride and 14 grams of solid citric acid were added. The composition was stirred at 60° C. until crystals were dissolved, and then neutralized by slow addition of ammonium hydroxide. The neutralized resin composition had NV=36.1%, pH=3.5, and viscosity 385 cps.

Example 15

Inventive

Testing of Cured Glass Fiber Specimens

Testing for Resin Compositions of Examples 11-14 was conducted in the same manner as described above in the Example 10. The results are shown in Table 4.

TABLE 4

| Binder, Example # | Dry strength, kgf | Wet strength, kgf | Retention, % | Water absorption, min |
|---|---|---|---|---|
| 11 | 6.1 | 4.9 | 80 | 2 |
| 12 | 6.2 | 5.8 | 94 | 48 |
| 13 | 6.0 | 5.2 | 87 | 21 |
| 14 | 6.6 | 5.1 | 77 | 60 |

The results indicate that the cure of polyacid based systems can be significantly improved upon addition of citric acid in wet strength and retention %. Binder 12 containing citric acid shows considerably higher wet strength and retention as compared to binder 11. The results of testing binders 13 and 14 show that good dry strength, wet strength and retention % can be obtained upon the addition of glucose or starch to a PVOH-based binder.

It can be seen from the results that the unmodified PVOH/MA composition 11 shows quite a poor water resistance after cure. However, the addition of citric acid, as well as starch and glucose, improves the water resistance of the cured polymer, probably because of additional cross-linking and increase in cure density.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A curable aqueous composition prepared by a process comprising combining the following components:
    (a) a hydroxy-containing polymer which is a combination of polyvinyl alcohol and at least one member selected from the group consisting of starch, modified starch and a sugar;
    (b) a multi-functional crosslinking agent which includes citric acid as a first nonpolymeric polyacid and optionally at least one selected from the group consisting of a second nonpolymeric polyacid, salts thereof, an anhydride, and a nonpolymeric polyaldehyde, and optionally
    (c) a catalyst;
    wherein the weight ratio of (a):(b) is from 95:5 to about 35:65,
    wherein the pH of the curable composition is increased in a positive direction to at least 1.25 upon addition of a nitrogenous base,
    wherein said polyvinyl alcohol has a viscosity up to 10 centipoise when in a 4% aqueous solution at 20° C.

2. The curable aqueous composition of claim 1, wherein sufficient nitrogenous base is added to raise the pH to be in the range of about 2.5 to about 6.5.

3. The curable aqueous composition of claim 1, wherein the polyvinyl alcohol has a number average molecular weight in the range of greater than 7,000.

4. The curable aqueous composition of claim 3, wherein the polyvinyl alcohol has a number average molecular weight in the range of 12,000 to 85,000.

5. The curable aqueous composition of claim 3, wherein the polyvinyl alcohol has a number average molecular weight in the range of greater than 13,000 to 45,000.

6. The curable aqueous composition of claim 1, having a nonvolatile content greater than 30 wt %.

7. The curable aqueous composition of claim 1, having a nonvolatile content of 32-43 wt %.

8. The curable aqueous composition of claim 1, wherein said hydroxy-containing polymer is a combination of polyvinyl alcohol and starch and the catalyst is present in the composition and is ammonium sulfate.

9. The curable aqueous composition of claim 8, wherein the polyvinyl alcohol is formed by hydrolyzing polyvinyl acetate or a copolymer of ethenol and vinyl acetate, wherein the final polymer is 70 mole % to 99 mole % hydrolyzed.

10. The curable aqueous composition of claim 1, wherein the multi-functional crosslinking agent further comprises a blocked nonpolymeric polyaldehyde.

11. The curable aqueous composition of claim 10, wherein the blocked nonpolymeric polyaldehyde is blocked with a blocking agent which is at least one selected from the group consisting of urea, ethylene urea, sorbitol, and ethylene glycol.

12. A cured composition comprising a nonwoven fiber in a cured binder wherein the cured composition is formed in a process comprising combining nonwoven fibers with the curable aqueous composition of claim 1 to form a mixture and curing the mixture.

13. The cured composition according to claim 12, wherein the process includes a step of diluting the curable aqueous composition with sufficient water so the curable aqueous composition has 5% by weight of nonvolatiles prior to the curing step.

14. The cured composition according to claim 12, wherein the nonwoven fiber is fiberglass.

15. The curable aqueous composition of claim 1, wherein the multi-functional crosslinking agent further comprises maleic anhydride.

16. A method of forming a curable aqueous composition comprising the following steps:
    a step of combining (a) a hydroxy-containing polymer with (b) a multi-functional crosslinking agent which includes citric acid as a first nonpolymeric polyacid and optionally at least one selected from the group consisting of a second nonpolymeric polyacid, salts thereof, an anhydride, and a nonpolymeric polyaldehyde, and optionally (c) a catalyst to form a curable aqueous composition; and
    a step of adding sufficient nitrogenous base to raise the pH in a positive direction to at least 1.25;
    wherein the weight ratio of (a):(b) is from 95:5 to about 35:65; and
    wherein said hydroxy-containing polymer is a combination of polyvinyl alcohol and at least one member selected from the group consisting of starch, modified starch and a sugar,
    wherein said polyvinyl alcohol has a viscosity up to 10 centipoise when in a 4% aqueous solution at 20° C.

17. The method according to claim 16, wherein the multi-functional crosslinking agent further comprises a blocked nonpolymeric polyaldehyde or an anhydride.

18. The method according to claim 16, wherein the polyvinyl alcohol has a number average molecular weight in the range of greater than 7,000.

19. The method according to claim 16, wherein sufficient nitrogenous base is added to raise the pH to be in the range of about 2.5 to about 6.5.

20. The method according to claim 16, wherein the multi-functional crosslinking agent further comprises maleic anhydride, and wherein said hydroxy-containing polymer is a combination of polyvinyl alcohol and starch and the catalyst is present in the composition and is ammonium sulfate.

21. A method for forming a nonwoven material comprising the following steps:
   combining (a) a hydroxy-containing polymer with (b) a multi-functional crosslinking agent which includes citric acid as a first nonpolymeric polyacid and optionally at least one selected from the group consisting of a second nonpolymeric polyacid, salts thereof, an anhydride, and a nonpolymeric polyaldehyde, and optionally (c) a catalyst to form a curable aqueous composition; and
   a step of adding sufficient nitrogenous base to raise the pH in a positive direction to at least 1.25; and
   combining the curable aqueous composition with nonwoven fiber, and
   heating the curable aqueous composition and nonwoven fiber at 130° C. to 250° C. for sufficient time to effect cure,
      wherein the weight ratio of (a):(b) is from 95:5 to about 35:65; and
   wherein said hydroxy-containing polymer is a combination of polyvinyl alcohol and at least one member selected from the group consisting of starch, modified starch and a sugar,
      wherein said polyvinyl alcohol has a viscosity up to 10 centipoise when in a 4% aqueous solution at 20° C.

22. The method for preparing the nonwoven material of claim 21, further comprising a step of diluting the curable aqueous composition with sufficient water so the curable aqueous composition has 95% by weight of water prior to the heating step.

23. The method for preparing the nonwoven material of claim 21, wherein the nonwoven fiber is fiberglass.

24. The method for preparing the nonwoven material of claim 21, wherein sufficient nitrogenous base is added to raise the pH to be in the range of about 2.5 to about 6.5.

25. The method for preparing the nonwoven material of claim 21, wherein the multi-functional crosslinking agent further comprises maleic anhydride, and wherein said hydroxy-containing polymer is a combination of polyvinyl alcohol and starch and the catalyst is present in the composition and is ammonium sulfate.

26. A curable aqueous composition prepared by a process comprising combining the following components:
   (a) a hydroxy-containing polymer which is a combination of polyvinyl alcohol and at least one member selected from the group consisting of starch, modified starch and a sugar;
   (b) a multi-functional crosslinking agent which includes citric acid as a first nonpolymeric polyacid and optionally at least one selected from the group consisting of a second nonpolymeric polyacid, salts thereof, an anhydride, and a nonpolymeric polyaldehyde,
   (c) a base, and optionally
   (d) a catalyst;
   wherein the weight ratio of (a):(b) is from 95:5 to about 35:65,
   wherein the pH of the curable composition is increased in a positive direction to at least 1.25 upon addition of a nitrogenous base,
   wherein said polyvinyl alcohol has a viscosity up to 10 centipoise when in a 4% aqueous solution at 20° C.

27. The curable aqueous composition of claim 26, wherein the multi-functional crosslinking agent further comprises maleic anhydride, and wherein said hydroxy-containing polymer is a combination of polyvinyl alcohol and starch and the catalyst is present in the composition and is ammonium sulfate.

28. The curable aqueous composition of claim 26, wherein sufficient nitrogenous base is added to raise the pH to be in the range of about 2.5 to about 6.5.

* * * * *